(12) United States Patent
Thibedeau

(10) Patent No.: US 9,070,133 B2
(45) Date of Patent: *Jun. 30, 2015

(54) INTELLIGENT COUPON NETWORK

(75) Inventor: Richard B. Thibedeau, Plainville, CT (US)

(73) Assignee: Intelligent Coupon Network, LLC, Plainville, CT (US)

( * ) Notice: Subject to any disclaimer, the term of this patent is extended or adjusted under 35 U.S.C. 154(b) by 1625 days.

This patent is subject to a terminal disclaimer.

(21) Appl. No.: 11/439,725

(22) Filed: May 23, 2006

(65) Prior Publication Data

US 2007/0276727 A1 Nov. 29, 2007

(51) Int. Cl.
*G06Q 30/02* (2012.01)

(52) U.S. Cl.
CPC ............ *G06Q 30/02* (2013.01); *G06Q 30/0225* (2013.01); *G06Q 30/0238* (2013.01); *G06Q 30/0239* (2013.01)

(58) Field of Classification Search
USPC .................. 705/14, 14.38, 14.1, 14.11, 14.39, 705/14.66
See application file for complete search history.

(56) References Cited

U.S. PATENT DOCUMENTS

| | | | |
|---|---|---|---|
| 4,601,490 A | 7/1986 | Brandon | 283/56 |
| 5,612,527 A | 3/1997 | Ovadia | 235/383 |
| 6,067,526 A | 5/2000 | Powell | 705/14 |
| 6,109,526 A | 8/2000 | Ohanian et al. | 235/462.45 |
| 6,199,044 B1 | 3/2001 | Ackley et al. | 704/275 |
| 6,230,143 B1 | 5/2001 | Simons et al. | 705/14 |
| 6,520,542 B2 * | 2/2003 | Thompson et al. | 283/51 |
| 6,938,821 B2 | 9/2005 | Gangi | 235/380 |
| 7,016,860 B2 | 3/2006 | Modani et al. | 705/14 |
| 7,076,444 B1 | 7/2006 | Baron et al. | 705/14 |
| 7,240,843 B2 | 7/2007 | Paul et al. | 235/472.01 |
| 7,578,435 B2 | 8/2009 | Suk | 235/379 |
| 2002/0143612 A1 | 10/2002 | Barik et al. | 705/14 |
| 2002/0161625 A1 | 10/2002 | Brito-Valladares et al. | 705/10 |
| 2004/0019564 A1* | 1/2004 | Goldthwaite et al. | 705/44 |
| 2004/0054575 A1 | 3/2004 | Marshall | 705/14 |
| 2004/0056101 A1 | 3/2004 | Barkan et al. | 235/472.03 |
| 2004/0107135 A1* | 6/2004 | Deatherage et al. | 705/14 |
| 2005/0015300 A1 | 1/2005 | Smith et al. | 705/14 |
| 2005/0033643 A1 | 2/2005 | Smith et al. | 705/14 |
| 2005/0171845 A1 | 8/2005 | Halfman et al. | 705/14 |
| 2005/0182695 A1* | 8/2005 | Lubow et al. | 705/28 |
| 2005/0192906 A1 | 9/2005 | Berstis | 705/59 |
| 2005/0230473 A1* | 10/2005 | Fajkowski | 235/383 |

(Continued)

FOREIGN PATENT DOCUMENTS

| | | |
|---|---|---|
| JP | 02-308654 | 12/1990 |
| JP | 03-254996 | 11/1991 |

(Continued)

OTHER PUBLICATIONS

"Polytronics: Rolling Out the Chips", Fraunhofer Magazine Jan. 2002, pp. 8-11.
Internet article, "UCC/EAN-128 Coupon Extended Codes", Mar. 1, 2006, www.morovia.com, 3 pgs.

(Continued)

*Primary Examiner* — John Van Bramer
(74) *Attorney, Agent, or Firm* — Thompson Hine LLP

(57) ABSTRACT

A system for redeeming coupons comprises a network; a Point-of-Sale (POS) terminal communicatively coupled to the network; a server communicatively coupled to the POS terminal; wherein the POS terminal transmits first coupon information from a coupon card read at the POS terminal to the server via the network.

35 Claims, 9 Drawing Sheets

(56) References Cited

U.S. PATENT DOCUMENTS

2006/0038396 A1* 2/2006 Thompson et al. ............ 283/67
2006/0247972 A1 11/2006 Baron et al. .................... 705/14

FOREIGN PATENT DOCUMENTS

| | | |
|---|---|---|
| JP | 10-287074 | 10/1998 |
| JP | 2000-020823 | 1/2000 |
| JP | 2002-041932 | 2/2002 |

OTHER PUBLICATIONS

Internet information, © Copyright 2006, Valassis Communications, Inc., www.valassis.com, 3 pgs.

"Who's Searching for You", http://www.zoominfo.com/people/Gray Gary 758777677.aspx, 3 pgs., Sep. 8, 2008.

"Couponchief", http://www.couponchief.com/pages/about, 4 pgs., Sep. 8, 2008.

"Lifehacker", http://www.lifehacker.com/software/coupons/find-discounts-online-with-coupon-chief-233654.php, 6 pgs., Sep. 8, 2008.

* cited by examiner

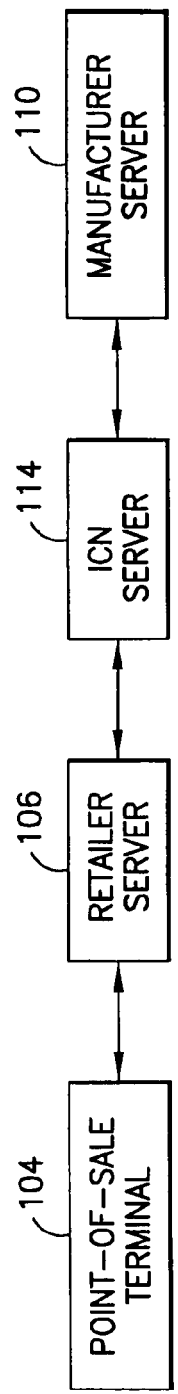
FIG.2A
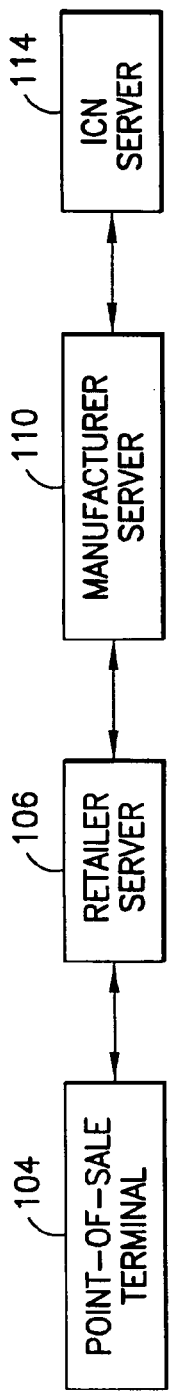
FIG.2B
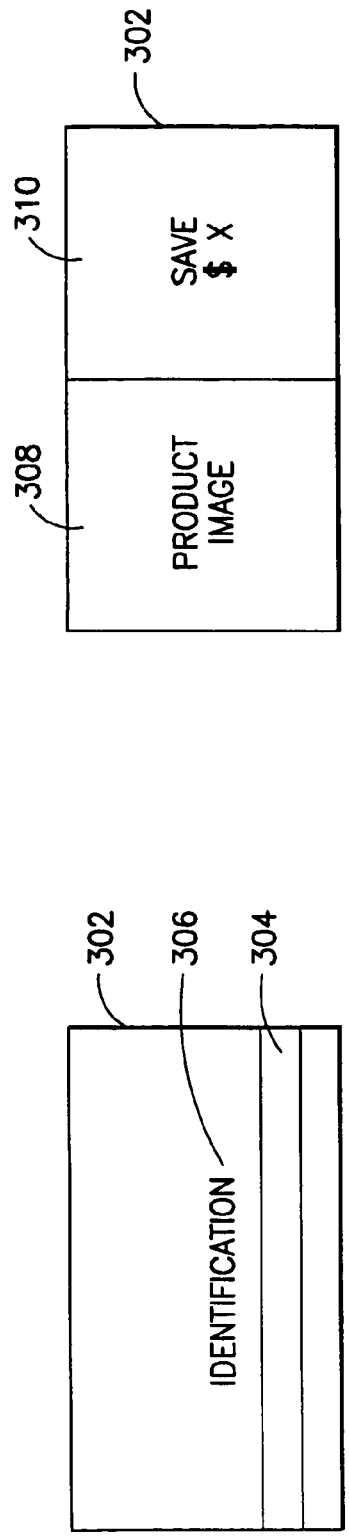
FIG.3A
FIG.3B

UNIFORM CODE COUNCIL SYSTEM 5 COUPON 5 12843 41076 7         (8101)3 72565 0506        (21) 12345678

| | | |
|---|---|---|
| NUMBER SYSTEM CODE | 5 | TRANSMITTED TO POS FOR VALIDATION |
| MANUFACTURE NUMBER | 12843 | TRANSMITTED TO POS FOR VALIDATION |
| FAMILY CODE | 410 | TRANSMITTED TO POS FOR VALIDATION |
| VALUE CODE | 76 | TRANSMITTED TO POS FOR VALIDATION |
| CHECK DIGIT | 7 | TRANSMITTED TO POS FOR VALIDATION |
| APPLICATION IDENTIFIER | (8101) | STORED IN ICN DATABASE |
| PRODUCT NSC | 3 | STORED IN ICN DATABASE |
| MOC CODE | 72565 | STORED IN ICN DATABASE |
| EXPIRATION DATE | 0506 (MMYY) | STORED IN ICN DATABASE |
| APPLICATION IDENTIFIER | (21) | STORED IN ICN DATABASE |
| HOUSEHOLD IDENTIFIER | 12345678 | STORED IN ICN DATABASE |

FIG.7

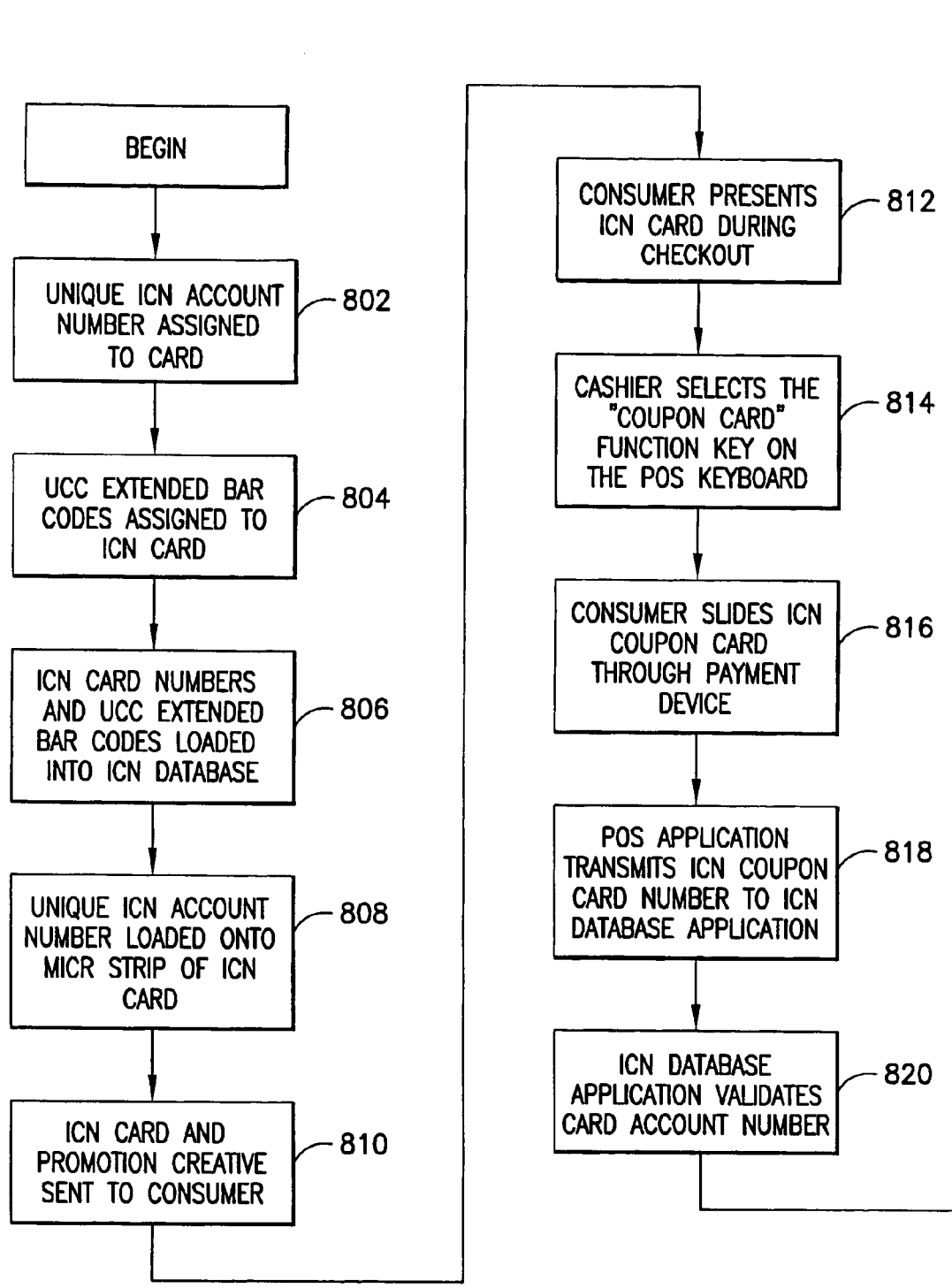

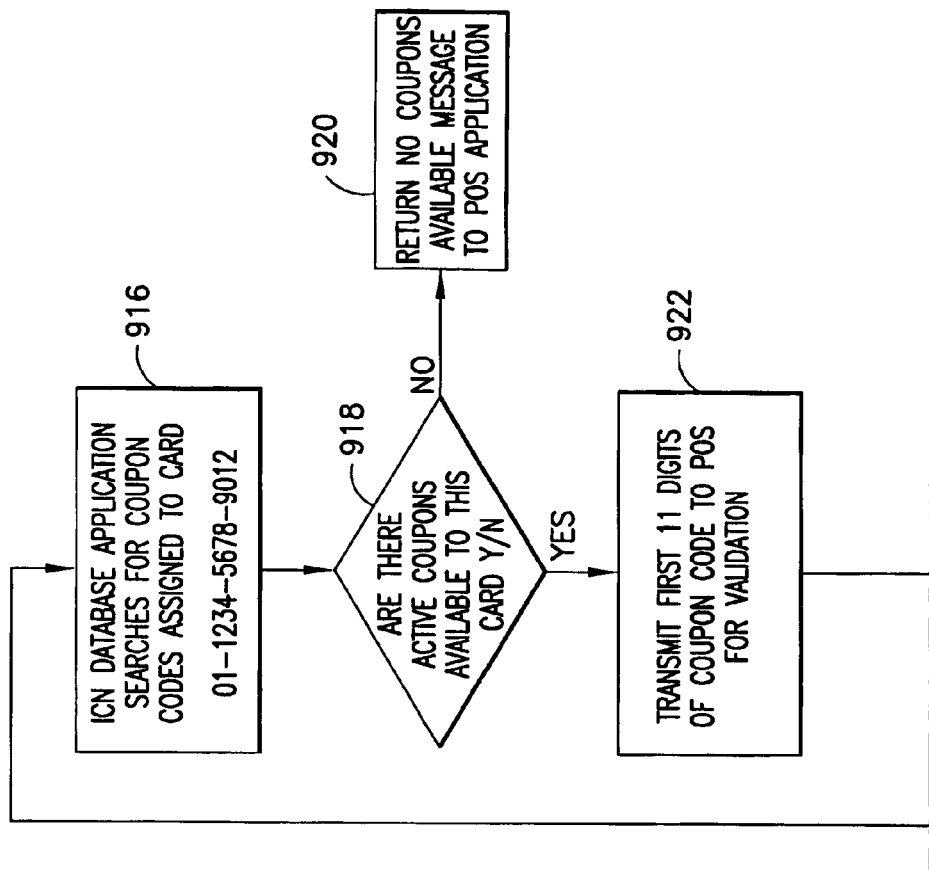
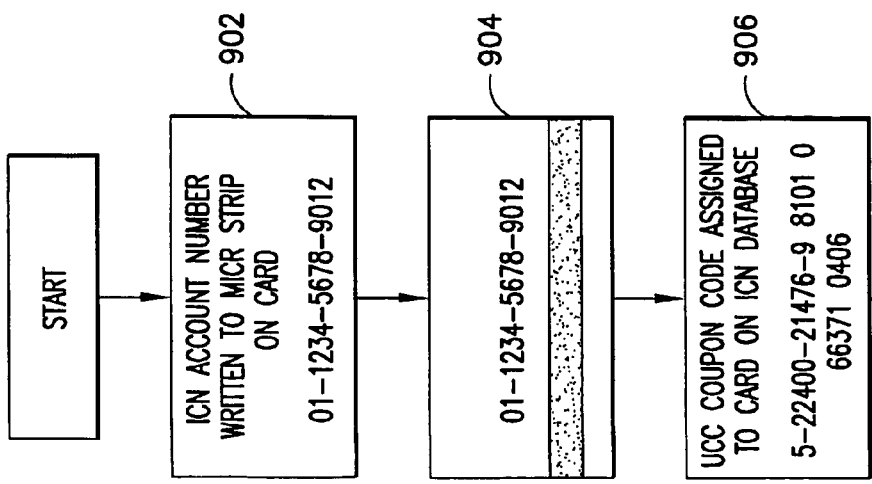
FIG. 9

INTELLIGENT COUPON NETWORK

TECHNICAL FIELD

The invention relates to the distribution and electronic processing of coupons and, in particular, to a network based system and method for validating and redeeming coupons.

BACKGROUND

Coupons provide benefits to manufacturers and consumers. For example, coupons are a beneficial way for manufacturers to test consumer interest in specific products, determine optimal pricing, and move out older inventory. Mail by the postal system, newspapers, and stores usually serve as outlets for providing coupons to consumers. Consumers benefit because coupons are universally accepted, follow GS1 (including Uniform Commercial Code) guidelines, are easily understood by consumers, and require no prior notification to a retailer.

However, there are several disadvantages to using coupons. These include, for the consumer, the labor and time expended in clipping and organizing coupons. For the manufacturer and retailer, the manual clearing of coupons is labor intensive and may not provide vital market intelligence for weeks or months. Extended barcodes, providing useful marketing intelligence to manufacturers, are not captured by retailers and therefore not available to manufacturers until the coupon completes the manual clearing process. Mistakes in printing of coupons also can last for the duration of a promotion.

Accordingly, there is a need for a fast, convenient way for processing coupons and quickly providing comprehensive market intelligence to retailers and manufacturers. Embodiments of the invention satisfy this need and others.

SUMMARY

In accordance with an aspect of the invention, a system for redeeming coupons is provided that comprises a network; a Point-of-Sale (POS) terminal communicatively coupled to the network; a server communicatively coupled to the POS terminal; wherein the POS terminal transmits first coupon information from a coupon card read at the POS terminal to the server via the network.

In accordance with another aspect of the invention, a method for processing coupons is provided comprising reading first coupon information from a coupon card at a Point-of-Sale (POS) terminal; transmitting the first coupon information through a network to a coupon processing server; and, if the coupon processing server validates the first coupon information, transmitting second coupon information through the network to the POS terminal.

In accordance with a further aspect of the invention, a coupon card is provided that comprises a substrate; and a non-optically readable code provided on the substrate, wherein the coupon card includes information relating to at least one coupon retrievable over a network, the coupon card information being readable using non-optically readable technology.

In accordance with a further aspect of the invention, a computer readable medium storing computer code for processing coupons across a network in response to the non-optical reading of a coupon card, includes computer code for reading identification code from a coupon card that is non-optically read at a Point of Sale terminal; computer code for processing and formatting the read identification code; computer code for transmitting the formatted identification code across the network; computer code for receiving, interpreting, and validating the identification code at coupon processing server; if the identification code is validated, computer code for retrieving coupon codes corresponding to the identification code from a centralized database; computer code for transmitting the retrieved coupon codes to the Point of Sale terminal via the network; and computer code for redeeming the coupon codes.

In accordance with a further aspect of the invention a coupon card, comprises a substrate; and readable code provided on the substrate. The coupon card includes a unique coupon card identification number that relates to at least one coupon code retrievable over a network, wherein the coupon card does not store coupon codes.

BRIEF DESCRIPTION OF THE DRAWINGS

The foregoing and other aspects of these teachings are made more evident in the following Detailed Description, when read in conjunction with the attached drawings, wherein:

FIG. 2A illustrates a block diagram of a first embodiment of information flow;

FIG. 2B illustrates a block diagram of a second embodiment of information flow;

FIG. 3A illustrates an embodiment of the back side of a coupon card;

FIG. 3B illustrates an embodiment of the front side of a coupon card;

FIG. 7 illustrates an embodiment of a coupon code format;

DETAILED DESCRIPTION

Non-limiting embodiments of the invention are further described below. However, it should be appreciated that some of the features of the embodiments of the invention could be used to advantage without the corresponding use of other features. As such, the foregoing description should be considered as merely illustrative of the principles of the invention, and not in limitation thereof. Further, one skilled in the art will appreciate that the invention can be practiced by other than the described embodiments; that these described embodiments are presented for the purposes of illustration and not of limitation.

Embodiments of the invention relate to a coupon processing system and method that allows for automatic processing of coupons and provides linkage between a coupon card and coupon information stored in a centralized database. The coupon processing may entail validation (and invalidation) and, when validated, redemption of the appropriate coupon(s) or other appropriate action. The embodiments present novel ways of bundling technologies, including existing technologies such as real time communications and large volume data processing facilities, into a functioning operational platform and also present novel ways for doing business. Consumers may use the coupon card for a variety of products offered by a manufacturer and/or retailer.

Figure 1:
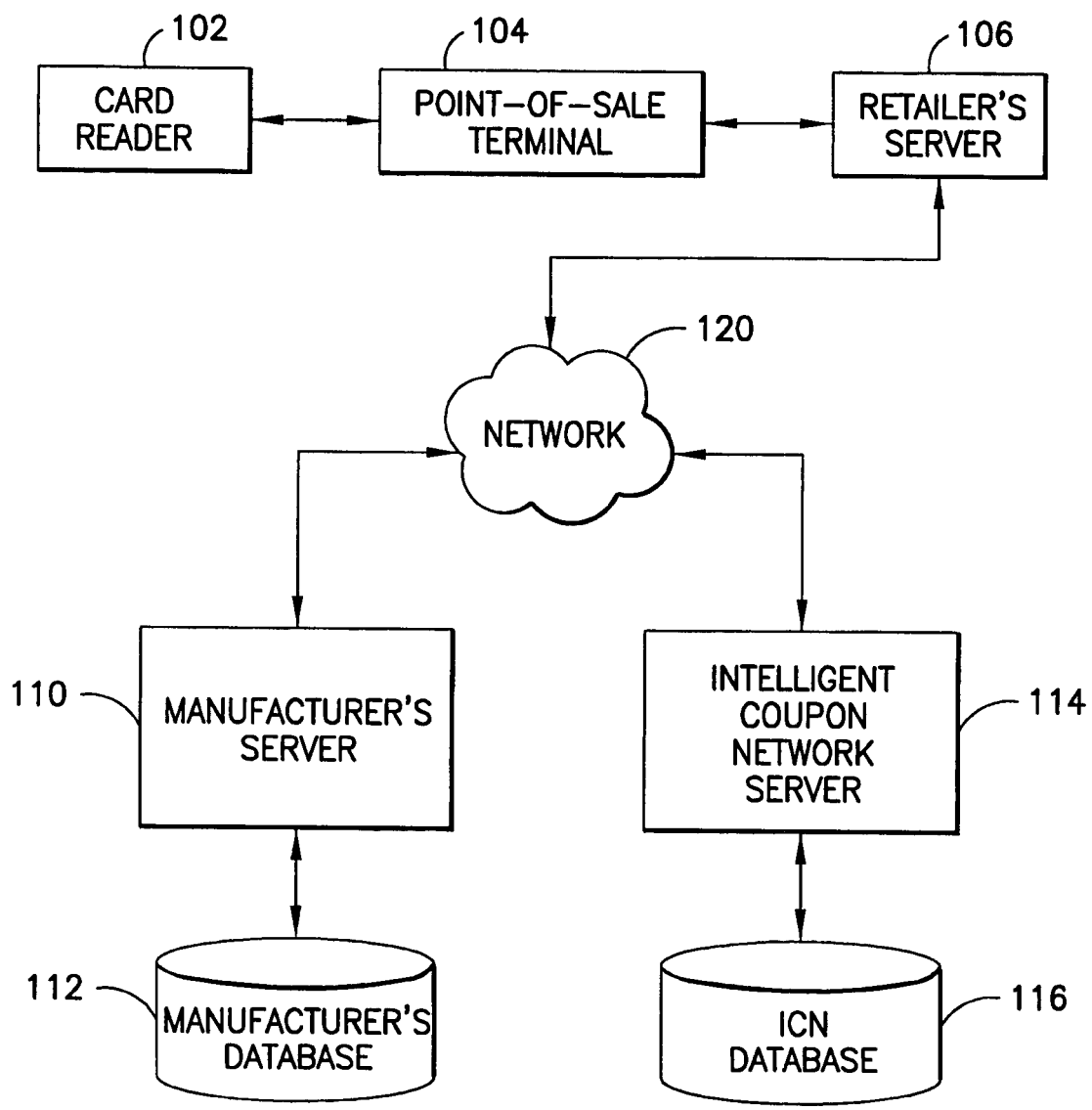
FIG. 1 illustrates an embodiment of a system for redeeming coupons.

FIG. 1 shows an embodiment of a system for redeeming coupons associated with a coupon card via a centralized database. The system may be an Intelligent Coupon Network (ICN) having an ICN server 114. An ICN is a system that provides for the electronic validation and redemption of coupons through real time communications and a centralized database, such as ICN database 116, which is coupled to the ICN server 114. The ICN server 114 executes software applications that process coupons for one or more manufacturers who have transacted with the owner of the ICN server 114 to provide such processing. The ICN server 114 may tabulate the raw data of the coupon processing transactions for a specific manufacturer and provide the tabulated data to the specific manufacturer in the form of reports.

Coupon processing typically includes validation and redemption and the supplying of the raw data to the appropriate manufacturer. In the embodiment shown in FIG. 1, a coupon card may be read by a card reader 102 at a retail store or other establishment. The coupon information from the coupon card may then be sent to the Point-of-Sale (POS) terminal which then may transmit the information to the retail store server 106. The central component of a POS terminal is the processor than executes software application(s). The POS terminal may include a processor, memory, input/output interface circuitry, and the software application(s) to reformat coupon information in an appropriate digital form. The retail store server may record the coupon information and may transmit it to server 114, such as an ICN server, via a network 120. The server includes a processor and input/output interfaces, as needed, and may be implemented as a microprocessor based device, a main frame, a stand alone computer, or a network of computing devices. An ICN server may be a server dedicated solely to the processing of manufacturers' coupons. Associated with the server may be a centralized database 116 that is incorporated within the server or may be a stand alone device or storage system, such as a Redundant Array of Independent Disks (RAID). The network 120 may be an internet, such as the World Wide Web, an intranet, an extranet, or another network, and may use wired or wireless technology or a mixture of wired and wireless technology. The ICN server 114 then may notify the manufacturer of a completed transaction or completed set of transactions by sending status information to the manufacturer's server 110. As in the case of the ICN server 114, the manufacturer's server 110 may also include a processor, input/output interfaces, and memory to perform the function of processing coupons. The manufacturer's database 112 may be stored within a memory of the manufacturer's server 110 or as a stand alone device or system. Instead of transmitting coupon information from the retail server 106 to the ICN server 114, the coupon information may be transmitted from the retail server 106 to the appropriate manufacturer's server 110 for redemption. In this alternative embodiment, the manufacturer's server 110 notifies the ICN server 114 of the coupon redemption, as shown in FIG. 2B.

The coupon processing system (e.g., ICN system) distributes coupon codes, such as standard Uniform Code Council System 5 coupon codes or GS1 coupon codes, associated with a coupon card. In an embodiment, the coupon card may be a one-use card. In another embodiment, the coupon card may be useable as long as at least one coupon offer has not expired for a product that has yet to be purchased or a product limit that has not been attained. In yet another embodiment, the coupon card may be updated so as to provide additional coupon offers to a consumer. In still a further embodiment, the coupon card may be a permanent coupon card in which coupon information is updateable via a manufacturer's server or a coupon processing server.

Embodiments of the invention relate to information associated with a coupon card. A unique account number may be assigned to the consumer coupon card on a magnetic ink character recognition strip (i.e., magstripe) on the back of the consumer coupon card. A magstripe card has a strip of binding material containing ferromagnetic particles which is capable of storing data and is read by a reader head such as may be found in magnetic card readers. The system may include a centralized database containing the unique account numbers assigned to each card and a list of available manufacture coupon codes assigned to the account numbers on each coupon card. The coupon card may link the consumer at the Point of Sale (POS) to a centralized database where the coupon promotions reside. The linkage of one or more coupon promotions to a coupon card may be set at the time the coupon card is provided with a unique account number or shortly thereafter. In embodiments, where the coupon promotions may be updated, the coupon card account number may be linked to various coupon promotions at various times. In distribution methods contemplated by the invention, the consumer may receive a coupon card through a variety of ways, including, but not limited to, on a product's package, newspapers, magazines, postal system mail, or in-store promotions. In one embodiment, during checkout, the cashier presses a coupon card function key on the POS terminal and the consumer may slide his or her coupon card through the card reader, whereupon the POS terminal software may establish a communications link with a server, such as the retailer's server 106 or other computing device, and transmit the account number on the coupon card over the store's real time communication line to the centralized database of a coupon processing computer, such as an Intelligent Coupon Network server 114. The centralized database application may validate the account number, query the centralized database for any active coupon codes found, and transmit the first set of digits/alphanumeric characters consisting of information, such as the NSC (Number System Code), Manufacture Number, Family Code, and Value Code of each active coupon code back to the POS terminal. Then, the POS terminal may begin a validation process to validate each coupon code against products purchased by the consumer for any coupon code redeemed, and the POS application, upon validation of a coupon code, may transmit back to the centralized database the second set of digits/alphanumeric characters, corresponding to the redeemed coupon code, such as the NSC (Number System Code), Manufacture Number, Family Code, and Value Code. In an example of an implementation, the first set and second set of digits are eleven digits each in the case of a system 5 coupon and or twelve digits each in the case of a system 99 coupon. The first and second set of digits may have an equal number of digits/alphanumeric characters or a different number of digits or alphanumeric characters. For example, the first set of digits may include 13 alphanumeric characters and the second set 11 alphanumeric characters.

The coupon card 302 may be formed on a substrate, such as plastic or paper or other medium that is typically flexible, sufficiently durable, and cost effective to produce. For example, a 10 mil thick plastic sheet may be sized to the length and width of a credit card or key ring card. Thus, the coupon card may advantageously be of various sizes including the form of a credit card, grocery store shopper's card or key ring for ease of carrying in a wallet or purse or on a key ring.

As shown in FIG. 3B, the front of the coupon card 302 may display an image 308 of one or more products for which the coupon card offers a discount, including an image 310 of the amount and conditions of the savings. The displayed image may be formed through printing directly on the substrate or through application of a preprinted label. Other image forming techniques may be used including polytronic labeling. To better protect the information on a coupon card, non-optically readable technology may be used. The non-optically readable technology may include electromagnetics, magnetics, or smart card technology. As shown in FIG. 3A, in an embodiment, the back of the coupon card 302 has a swipe strip 304, preferably a Magnetic Ink Character Recognition (MICR) strip. Alternatively, Radio Frequency Identification (RFID) technology or other electromagnetics technology, such as Radio Frequency Data Communication (RFDC), may be employed. Where an RFID coupon card is implemented, the corresponding electronic circuitry on the coupon card may be formed on or adhered to the substrate of the coupon card. Yet, alternatively, optically readable technology, such as optically scannable bar codes, may be used. In an optically readable embodiment, coupon identification information 306 may be provided in a user viewable form on the back of the coupon card 302. In certain embodiments, biometric identification techniques may be employed. For example, in a biometric identification embodiment, a fingerprint scanning pad may be attached or placed proximate to the card reader in which a communications link is established between the fingerprint scanning pad and the POS terminal.

Figure 5:
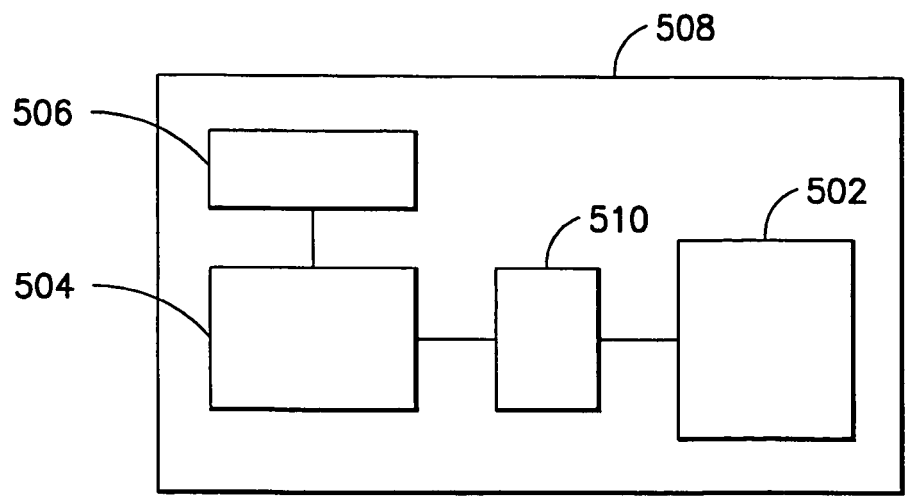
FIG. 5 illustrates a second embodiment of the coupon card utilizing RFID technology.

FIG. 5 illustrates an embodiment of a coupon card using RFID technology. An antenna 502 on the coupon card 508 may transmit and receive information from an RFID reader. The received information may be filtered, amplified, and digitized by processing signal circuitry 510 which may then be further processed for information content by processor 506. Coupled to the processor may be a memory 506. The coupon card memory 506 may be of one or more types of memory, including volatile memory, such as random access memory, and/or non-volatile memory, such as battery backed random access memory and/or read only memory.

Figure 4:
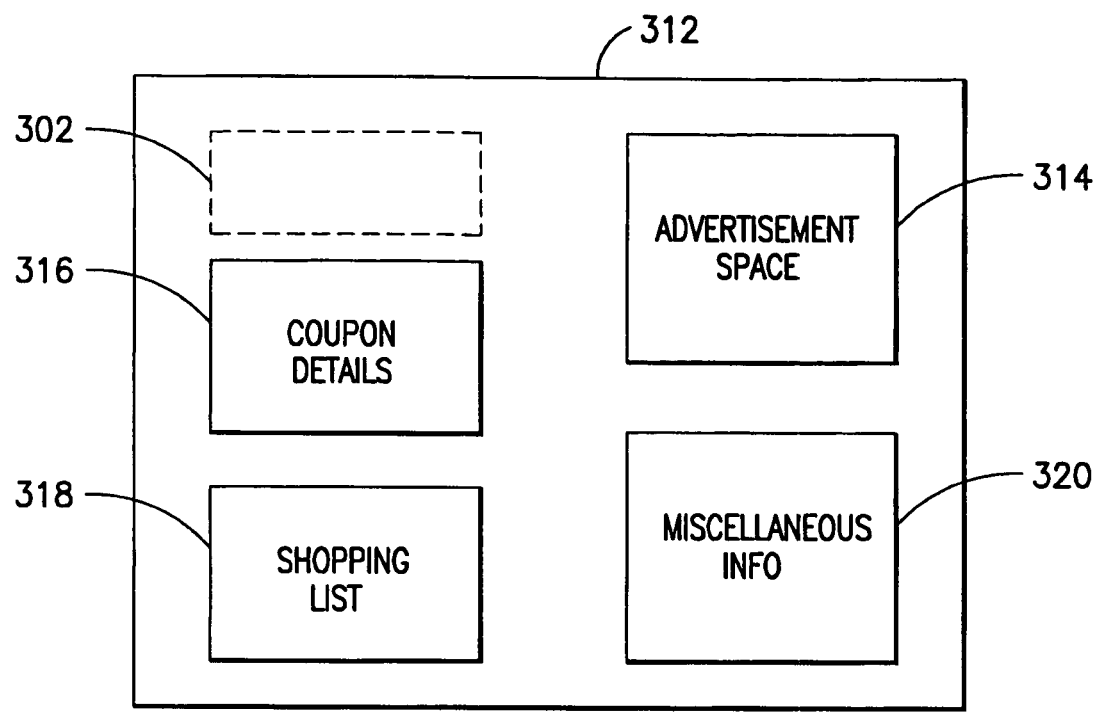
FIG. 4 illustrates a first embodiment of an insert with a card attached.

Embodiments of the invention offer a way for Consumer Package Good's (CPG) manufacturers (i.e., manufacturers of consumables such as cleaning products, food, beverages, clothing, and the like) to distribute GS1, Uniform Code Council guideline or other coupons without the need of an optically readable barcode. Through a Direct Mail promotion, In-Store promotion, or a Free-Standing Insert (FSI) in the Sunday newspaper, the consumer may receive an insert, sheet, or flyer with a coupon card having a Magnetic Ink Character Recognition strip on its back. To aid a consumer, a shopping list 318, as shown in FIG. 4, may be provided along with a removable coupon card 302 detachable or removable from the insert, sheet, or flyer 312. To further aid a consumer, coupon information 316 may be printed or labeled on the insert, sheet, or flyer 312. The coupon information, in an embodiment, may provide a list of one or more brands with the amount of savings on a purchase; for example, Brand A's coupon may be a 50 cent off coupon, Brand B may require a purchase of two Brand B products for a savings of $2, Brand C may offer a 60 cent savings when purchased with Brand D, etc. Additionally, a space 314 may be dedicated to advertising, such as by displaying an image of one or more of the products, and another space 320 dedicated to miscellaneous information, such as a recipe. The revenue source for the coupons may be the manufacturer of Consumer Package Goods (CPG). The CPG manufacturer may pay for printing and distributing coupons on the coupon processing network, including FSI pages, Direct Mail, and In-Store, on package printing or labeling, coupon clearing fees, and real time data feeds for up to date promotion analysis and accounting.

Figure 6:
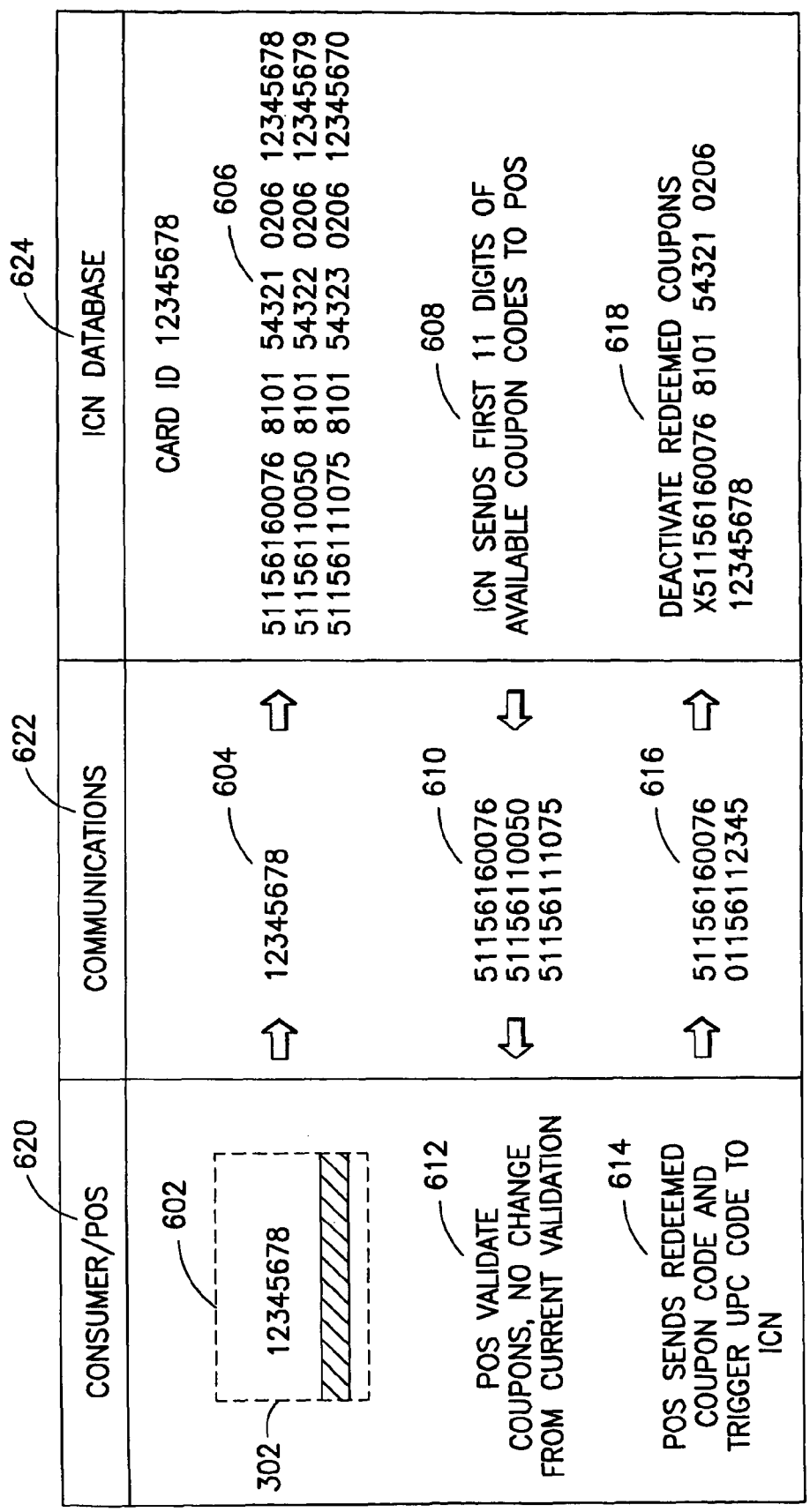
FIG. 6 illustrates an embodiment of a coupon redemption process between a Point of Sale terminal and an Intelligent Coupon Network server.

FIG. 6 illustrates an embodiment of a method for processing one or more coupons from a coupon card. In an embodiment, contained in the MICR strip of a coupon card is a unique number assigned to the coupon card. At the POS 602, the consumer may swipe his/her coupon card through a card reader as would be done in a debit or credit card transaction. Using the real time communication network in the store, a network message may be sent 604 to the centralized database containing the unique coupon card account number along with the retailer's identification and location. The coupon processing server coupled to the centralized database may validate the unique ID number 606 and search for available coupons assigned to the card in the coupon processing server centralized database. Any coupon codes which have not expired or were not previously redeemed may be transmitted back to the POS terminal for normal validation 608 as part of a message that includes the retailer's identification and location and the identification of the POS terminal. For any coupon which is redeemed, the POS terminal may send back a network message to the coupon processing server centralized database indicating which coupons were successfully redeemed. The coupon processing server centralized database may update the customer record, accordingly. As shown in FIG. 6, the coupon processing server may send the first several (e.g., eleven) digits/alphanumeric characters of the available coupon codes to the POS terminal via the retail server and network 610. The POS terminal may validate the coupons 612 and send the redeemed coupon code to the coupon processing server 614 as a second several digits/alphanumeric characters and also, as additional digits and alphanumeric characters, other GS1 coupon code information (e.g., by triggering the Uniform Product Code (UPC) of the barcode information from a scanned product corresponding to the coupon being redeemed), to the coupon processing server via the network 616. The coupon processing server may then deactivate the redeemed coupons 618. The coupon processing server may also retrieve the remainder of the GS1 code corresponding to each of the redeemed coupons and send this information and information regarding the unique coupon card number and retailer information (e.g., location, POS terminal identification, time of purchase) to the corresponding CPG manufacturer.

The method of distributing, redeeming, and clearing Manufacturer Coupons may benefit all three groups involved in the transaction—consumers, retailers, and manufacturers. The benefit to consumers is the ease of use because clipping and/or organizing coupons is no longer needed. The benefits to the retailer are reducing the labor associated with processing paper coupons and substantially reducing the time it takes to receive reimbursement for the promotions from the manufacturer. The benefits to the manufacturer potentially include a better product for the consumer resulting in increase response rates, real time promotion tracking, faster and more reliable accounting, and a reduction in fraud associated with paper coupons.

Thus, embodiments disclosed provide a system and method that may be used for electronically distributing and clearing a variety of coupons. Each coupon may have a code. Each coupon code may include a base portion and an extended portion. For example, the embodiments may be used with GS1 coupons, such as the formerly designated Uniform Code Council (UCC) system five and system ninety nine manufacture coupons. GS1 format standards are maintained by the GS1 standards organization, formerly known as the Uniform Code Council. In an embodiment, similar to debit, credit and Electronic Benefit Transactions (EBT), the POS terminal reads a unique code from a coupon code and transmits this unique code to a centralized database, such as the centralized database of a coupon processing server via a network.

An example of an implementation of the coupon processing method of the invention is provided. A coupon card with unique coupon card account number 12345678 may have a coupon for 0.50 off a 2 liter beverage drink assigned to it; for example, 54900011050x, where x is the check digit. The check digit may be useful for paper coupons with barcodes being scanned by a scanner. On the ICN centralized database, the full coupon code assigned to card 12345678 may include a string of digits or alphanumeric characters such as 54900011050 x 8101 0 88062 0306. The consumer may purchase a 2 liter beverage drink with, for example, UPC code 0:49000:06390 and may swipe his or her coupon card. The POS terminal may transmit the coupon card account number, 12345678, to the ICN server. The ICN server may then send back a corresponding coupon code, e.g. 54900011050, to the POS terminal. The POS terminal then may determine if the coupon code is valid through a validation process, such as standard coupon validation routines. The POS terminal may send back to ICN a redeemed coupon code, e.g., 54900011050, and a triggering UPC product code, e.g., 04900006390. The ICN server may also provide in real time to the beverage drink manufacturer the fully redeemed coupon code, the location of the redemption transaction, and the product that triggered the redemption.

FIG. 7 shows an example of coupon format as the GS1 US format (formerly known as the Uniform Code Council System 5 coupon). A first portion of the coupon code may be GS1 US code, formerly known as the Universal Product Code (UPC), shown, in FIG. 7, to include a Number System Code, a manufacture number, a family code, a value code, and a check digit. A second portion of the coupon code may be the 'Extended Portion,' which includes information such as Manufacture Offer Code (MOC), Expiration Dates, Household Identifier, and associated application codes, and may correspond to the GS1, or European Article Numbering (EAN-128), format. The Extended Portion, as shown in FIG. 7, may include an application identifier, a product number system code (NSC), a manufacture offer code (MOC), an expiration date, another application identifier, and a household identifier. While this information may be necessary to the manufacturer, it is not currently captured and the extended portion of the code may not even be read when scanned by the POS terminal in which case the manufacturer may have to wait weeks until the redeemed coupon has completed the long journey through the manual coupon clearing process. In contrast, with a coupon redeemed through a coupon card of the invention, this information is available immediately upon receiving the network message that a particular coupon has been redeemed. Other coupon code formats are contemplated by the invention.

The method for processing coupons may include reading first coupon related information from a coupon card at a Point-of-Sale (POS) terminal. The first coupon related information may be householder identifier information, account identification, or the like. The first coupon related information may be transmitted through a network to coupon processing server. If the coupon processing server validates the first coupon related information, second coupon related information may be transmitted from the coupon processing server through the network to the POS terminal. The second coupon related information may be one or more system 5 or system 99 coupon codes available to the identified consumer and may include the NSC (Number System Code), Manufacture Number, Family Code, and Value Code.

Figure 8B:
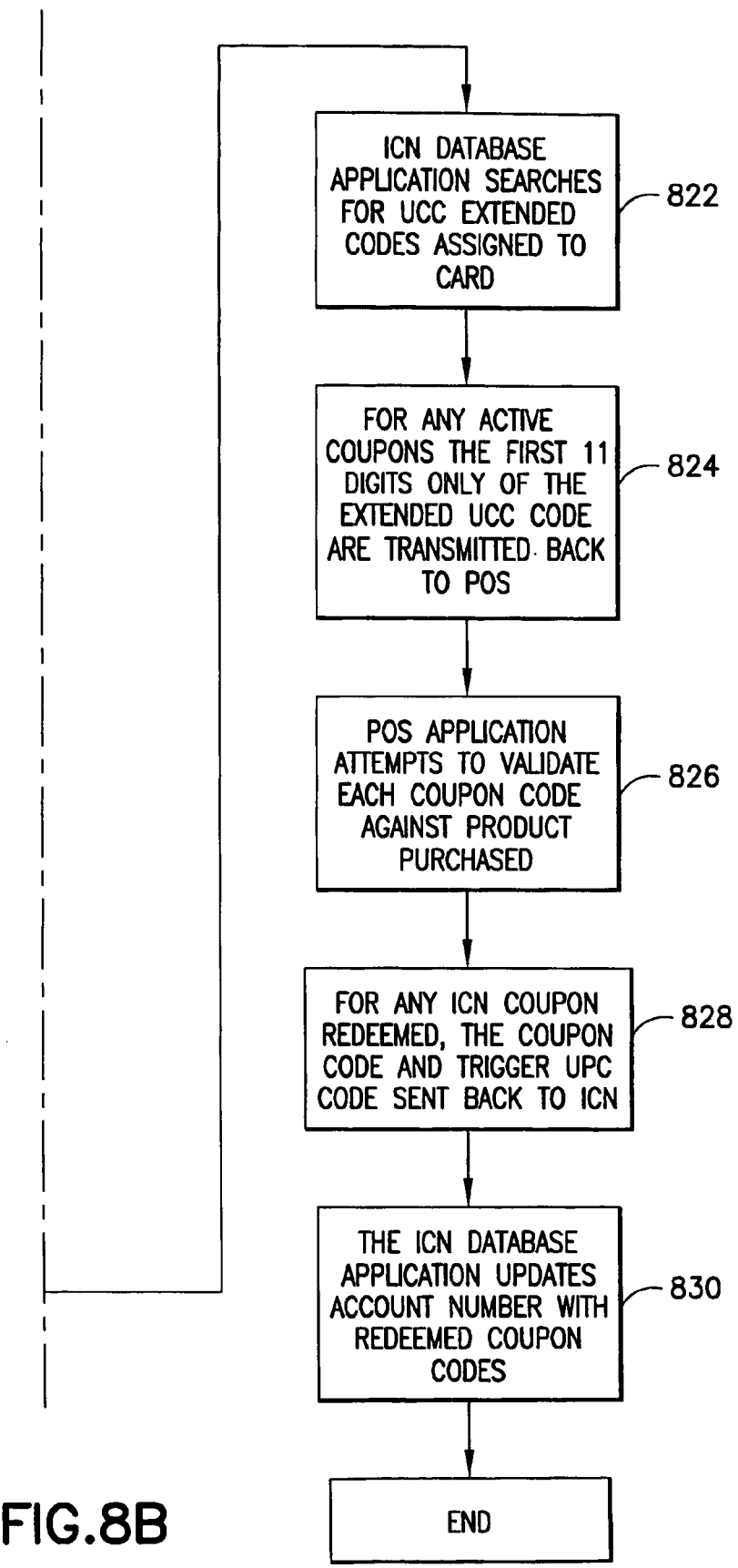
FIG. 8 (FIGS. 8A and 8B) illustrates an embodiment, in detail, of the process of generating and redeeming a coupon card.

FIG. 8 shows a flowchart of an embodiment of a method of the invention. A unique card account number, such as a unique coupon card account number, may be assigned to a coupon card 802. The unique card account number may be a randomly generated number, a household number, the first portion of the coupon code of FIG. 7, or the like. Coupon codes may be then assigned to the coupon card 804. For example, GS1 system codes may be assigned to the coupon card. The unique card account number and coupon codes may be loaded into the coupon processing server database 806. The unique card account number may be loaded onto the MICR strip of the coupon card 808 through a magstripe writer. The coupon card and promotion may be sent to the consumer 810. The consumer may present the coupon card during checkout 812 to purchase a product that corresponds to a coupon associated with the coupon card. The cashier may select the coupon card function key on the POS terminal keyboard 814. Alternatively, the coupon card redemption process may be initiated automatically through the reading of the coupon information on the card. The consumer thereupon may slide the coupon card through the card reader for a magnetic swipe card or wave the card in proximity to a RFID reader 816 which reads the unique coupon card account number. A software application of the POS terminal may transmit the unique coupon card account number (as first coupon related information) to the coupon processing server database application 818 as part of a message package that includes identification of the retailer and identification of the POS terminal, either directly or via a retailer server. The coupon processing server database application may validate the unique coupon card account number 820 or send back an error message to the POS terminal. The coupon processing server database application may search for the coupon code (e.g., GS1 code) assigned to the coupon card 822. For active coupons, in an embodiment, the first eleven or twelve digits/alphanumeric characters of the coupon code consisting of the NSC (Number System Code), Manufacture Number, Family Code, and Value Code may be transmitted back to the POS terminal 824 in a message package that identifies the retailer and the POS terminal (second coupon related information). In other embodiments, a different number of digits/alphanumeric characters may be used. The software application at the POS terminal initiates a validation process of each coupon code received against the product(s) purchased 826. For any coupon redeemed, the corresponding coupon code may be sent back to the coupon processing server 828 along with the triggering UPC code of the corresponding product purchased as well as identification of the retailer and POS terminal and time of purchase (third coupon related information). The coupon processing server database application updates the unique coupon card account number with the redeemed coupon codes 830. Furthermore, the coupon processing server may then retrieve the remainder of the GS1 code (i.e., the GS1 code that was not transmitted to the POS terminal) of each redeemed coupon and report this information as part of a report to the corresponding CPG manufacturer. The invention is useful for providing market intelligence quickly to a manufacturer, a benefit not known to be provided by current technologies.

Figure 9B:
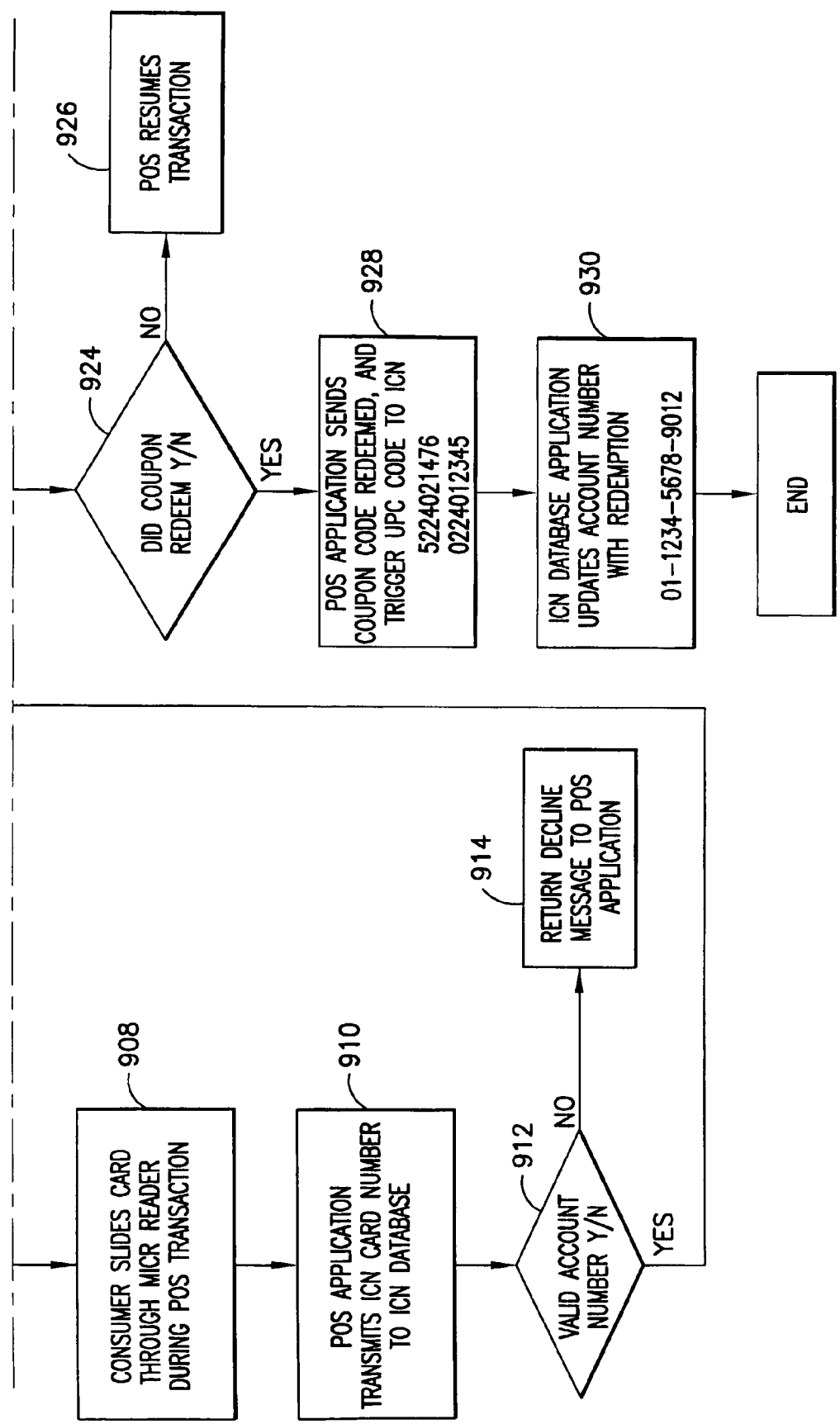
FIG. 9 (FIGS. 9A and 9B) illustrates an alternate embodiment, in detail, of the process of generating and redeeming a coupon card.

An alternative embodiment is provided in FIG. 9. The unique coupon card account number may be written to an MICR strip on the coupon card 902. The magnetic strip side of a coupon card is shown 904. The coupon code may be assigned to the card on the coupon processing server centralized database 906. A consumer may slide the coupon card through the MICR reader during a POS transaction 908. The POS software application may transmit the read unique coupon card account number to the coupon processing server 910 as part of a message package that identifies the retailer and the POS terminal (first coupon related information). The coupon processing server may check to determine if the unique coupon card account number is valid 902. If the account number is not valid, the coupon processing server may return a decline message to the POS software application 914. If the account number is validated, the coupon processing server database application may search for coupon codes assigned to the coupon card 916. A determination may be made as to whether there are active coupons available on the coupon card 918. If not, the coupon processing server may return a no coupons available message to the POS software application 920. If the coupon code is validated, active coupon codes (e.g., system 5 or 99 codes) assigned to the card may be transmitted back to the POS for validation against purchases 922 as part of a message package that identifies the retailer and POS terminal (second coupon related information). For example, the first 11 digits of the coupon code may be transmitted to the POS terminal for validation 922. A determination may be made as to redemption of the coupon(s) 924. If there has been no redemption of the coupon(s), the POS may resume the transaction 926. For coupons which are redeemed, the POS may send back the redeemed coupon code of the product which triggered the coupon redemption to the coupon processing server centralized database 928 along with the original redeemed coupon code information, the location of the retailer, identification of the POS terminal, and time of purchase (third coupon related information). The coupon processing server centralized database application may update the unique coupon card account number with the time, date, amount, location, and other information relating to the redemption activity 930. The coupon processing server may generate a report to the manufacturer regarding the coupon redemption transaction as requested or periodically to provide quick market intelligence to a CPG manufacturer.

Embodiments of the method of the invention may be implemented through instructions, stored on a computer-readable medium on a data storage device, which when executed by a computing device, cause the computing device to perform the designated operations. The instructions may be stored in computer-readable medium in a distributed fashion across two or more computing devices or as a single computing device. The computing devices may be one or more of the above mentioned servers. In an embodiment, the computer readable medium may be a small flash drive that connects to a Universal Serial Bus (USB) port of a POS terminal, a retailer server, or the like. For example, a small flash drive may measure less than about 10 cm×3 cm×3 cm) or may be pen-sized dimensions, such as 71 mm×20 mm×8 mm.

In an embodiment, a computer readable medium storing computer code for processing coupons across a network in response to the non-optical reading of a coupon card, includes computer code for reading identification code from a coupon card that is non-optically read at a Point of Sale terminal; computer code for processing and formatting the read identification code; computer code for transmitting the formatted identification code across the network; computer code for receiving, interpreting, and validating the identification code at coupon processing server; if the identification code is validated, computer code for retrieving coupon codes corresponding to the identification code from a centralized database; computer code for transmitting the retrieved coupon codes to the Point of Sale terminal via the network; and computer code for redeeming the coupon codes.

The coupon processing server coupon distribution and processing system and method offers advantages including 1) being easy to use, 2) saving time and money, 3) providing better validation, 4) expanding promotion tracking, 5) increasing response rates, and 6) reducing fraud. The coupon processing server coupon distribution and processing system and method are easy to use because there is no clipping or organizing of coupons and the coupon card may be discarded after the coupons are redeemed. The coupon processing server coupon distribution and processing system and method saves time and money because it avoids the manual counting and clearing of paper for both retailers and manufacturers. Coupon processing server coupon distribution and processing system and method coupons clear electronically so that financial settlements may be completed in a short period of time, such as hours, rather than weeks or months. Coupon coding errors may be corrected immediately as manufacturers avoid the handling of misprinted coupons that may circulate for months at a time. The coupon processing server coupon distribution and processing system and method provides better validation because the expiration dates are enforced by the coupon processing server. Expired coupons are recognized as such and are not sent to the POS for validation. Paper coupons may not be redeemed at a POS because of a faulty barcode or improper coding or printing. With the coupon processing server coupon distribution and processing system and method described herein, the use of a magnetic ink character recognition strip or RFID eliminates the problem of poorly printed barcodes. Invalid coupon codes may be corrected immediately in the centralized database. The coupon processing server coupon distribution and processing system and method expands promotion tracking with the real time reporting of coupon redemptions. Manufacturers are provided with the product information for the product the consumer purchased to trigger the coupon redemption. Manufacturers may track results at the individual household level by assigning unique numbers to the extended portion of the coupon code's application identifier.

The coupon processing server coupon distribution and processing system and method described herein also increases response rates by making the process of collecting and redeeming coupons easier and more in line with today's technology. The coupon processing server coupon distribution and processing system and method further reduces fraud as each coupon may be redeemed only once. Advantageously, the coupon processing server coupon distribution and processing system and method centralized database does not transmit to the POS a coupon which has already been redeemed. The coupon processing server coupled to the centralized database may also track in real time redemptions by store. Alternatively the centralized database may have one or more coupon processing processors built into it. Each redemption transaction has a date and time stamp. Abnormal transaction volumes from a particular store may be identified to prevent store personnel and/or others from fraudulently redeeming coupons for personal gain, to meet or exceed sales goals, and the like. The coupon processing server coupon distribution and processing system and method prevents a person from assembling a large volume of newspaper inserts to redeem coupons without selling the corresponding product. In another example, if someone were to determine how account numbers are generated on the coupon cards, the coupon processing serve may monitor in real time the volume and traffic of redeemed coupons and identify abnormalities to prevent coupon counterfeiting.

A further advantage is that embodiments may be implemented to provide a direct competitor to various marketing services by distributing coupon cards through Direct Mail, In-Store, and FSI or implemented as a service provider to marketing services. For example, marketing services companies may be charged for the distribution of coupons on the coupon processing server in which case the business model may be executed with less expense.

If a coupon is valid, but the retailer is temporarily out of stock, provisions may be made to issue a rain check electronically. The electronic rain check may be stored in the centralized database. Alternatively, in lieu of a rain check, the coupon processing server may offer a different product of the manufacturer at a special rate to the consumer.

As part of the system and method of the invention, in an embodiment, in-store scanners may also be provided to allow a consumer to reveal unexpired and unused coupons available through his or her coupon card.

In an embodiment, Consumer Package Good's (CPG) manufacturers may create and maintain their own shopper card program. For example, CPG manufacturer A may offer consumers a program in which each consumer or consumer household may sign up for a permanent card number. A consumer using such a coupon card may supply sufficient identification at the Point of Sale. This identification may include a driver's license, a passport, or other identification means, such as entry of a special code or biometrics scanning. The consumer, upon enrolling in a CPG manufacturer's program and being assigned a permanent coupon card, may then select discounts from CPG manufacturer A's web site in which the discounts would then be assigned to that permanent coupon card through a registration process using a centralized database of CPG manufacturer A.

In an embodiment, if the coupon processing server is experiencing down time, a retailer may access a mirror database maintained by a company managing the coupon processing server. Alternatively, individual manufacturers may keep mirrored versions of the coupon processing server's centralized database regarding their own coupons and redemption information in which case the individual manufacturers may offer a backup method for redeeming coupons if the coupon processing server were to become unavailable.

It is believed that the invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A computer-readable medium storing instructions executable by a processor to perform operations for processing coupons across a network, the operations comprising:
   receiving, at a coupon processing server, a unique account identifier from a first point of sale terminal via a network, where the coupon processing server is configured to communicate with a plurality of point of sale terminals, where the unique account identifier was scanned at the first point-of-sale terminal which is located at a retail store and where the coupon processing server is at a location that is remote from the retail store;
   in response to receiving the unique account identifier, determining whether at least one valid coupon is associated with the unique account identifier in a database of accounts;
   in response to determining that at least one valid coupon is associated with the unique account identifier in the database of accounts, transmitting, from the coupon processing server, an indication of the at least one valid coupon to the first point of sale terminal via the network, wherein the indication includes the at least one valid coupon;
   in response to receiving, at the coupon processing server from the first point of sale terminal, an indication of at least one redeemed coupon, updating the database of accounts and transmitting, from the coupon processing server to a manufacturer associated with the at least one redeemed coupon, an indication that the at least one redeemed coupon was redeemed against a purchased transaction,
   where the at least one redeemed coupon is at least one of the at least one valid coupon.

2. The computer-readable medium of claim 1, where a valid coupon comprises a first coupon code portion and a second coupon code portion.

3. The computer-readable medium of claim 2, where the indication of the at least one valid coupon comprises the first coupon code portion but not the second coupon code portion and
   the indication that the at least one redeemed coupon was redeemed comprises the second coupon code portion.

4. The computer-readable medium of claim 2, where the first coupon code portion comprises one of: a GS1 EAN/UPC Type 5 barcode, a GS1 128 barcode, and a GS1 Databar barcode and
   where the second coupon code portion comprises a manufacture offer code.

5. The computer-readable medium of claim 1, where the indication of at least one redeemed coupon further comprises purchase transaction information, where the purchase transaction information comprises at least one of an identification of a product purchased, a time of the purchase transaction and a location of the purchase transaction.

6. The computer-readable medium of claim 5, where the indication that the at least one redeemed coupon was redeemed further comprises the purchase transaction information.

7. The computer-readable medium of claim 1, where the operations further comprise monitoring at least volume and traffic of redeemed coupons to identify abnormalities and to prevent coupon counterfeiting.

8. The computer-readable medium of claim 1, where determining whether at least one valid coupon is associated with the unique account identifier in the database of accounts comprises:
   determining whether at least one associated coupon is associated with the unique account identifier in the database of accounts, and
   for each associated coupon of the at least one associated coupon, determining whether the associated coupon has been previously redeemed and determining whether the associated coupon has expired,
   where the associated coupon is determined to be a valid coupon in response to both determining that the associated coupon has not been previously redeemed and determining that the associated coupon has not expired.

9. The computer-readable medium of claim 1, where updating the database of accounts comprises deactivating the at least one redeemed coupon.

10. The computer-readable medium of claim 1, where the operations further comprise, in response to determining that no valid coupons are associated with the unique account identifier in the database of accounts, transmitting, from the coupon processing server, a "no coupons available" message to the first point of sale terminal via the network.

11. A computer-readable medium storing instructions executable by a processor to perform operations for processing coupons across a network, the operations comprising:
   scanning, at a point-of-sale terminal located at a retail store, a unique account identifier;
   during a purchase transaction, transmitting, from the point of sale terminal, the unique account identifier to a coupon processing server via a network, where the coupon processing server is configured to communicate with a plurality of point of sale terminals and where the coupon processing server is at a location that is remote from the retail store;
   in response to transmitting the unique account identifier, receiving, at the point of sale terminal, an indication of whether at least one valid coupon is associated with the unique account identifier from the coupon processing server via the network, where a valid coupon is a coupon that has been validated by the coupon processing server and the indication includes the at least one valid coupon;
   in response to receiving the indication that the at least one valid coupon is associated with the unique account identifier, the point of sale terminal completing the purchase transaction by validation of the at least one valid coupon against the purchased transaction; and
   in response to the purchase transaction comprising a redemption of at least one of the at least one valid coupon, transmitting, from the point of sale terminal to the coupon processing server, an indication of the at least one redeemed coupon.

12. The computer-readable medium of claim 11, where a valid coupon comprises a first coupon code portion and a second coupon code portion.

13. The computer-readable medium of claim 12, where an indication of the at least one valid coupon comprises the first coupon code portion but not the second coupon code portion.

14. The computer-readable medium of claim 12, where the first coupon code portion comprises one of: a GS1 EAN/UPC Type 5 barcode, a GS1 128 barcode, and a GS1 Databar barcode and
   where the second coupon code portion comprises a manufacture offer code.

15. The computer-readable medium of claim 11, where, when at least one valid coupon is associated with the unique account identifier, the indication of whether at least one valid coupon is associated with the unique account identifier comprises an indication of the at least one valid coupon.

16. The computer-readable medium of claim 11, where the indication of at least one redeemed coupon further comprises purchase transaction information, where the purchase transaction information comprises at least one of: an identification of a product purchased, a time of the purchase transaction and a location of the purchase transaction.

17. An apparatus, comprising a processor and a memory storing software, the processor is configured to, when executing the software, cause the apparatus to perform operations, the operations comprising:
   to receive a unique account identifier from a first point of sale terminal via a network, where the apparatus is configured to communicate with a plurality of point of sale terminals, where the unique account identifier was scanned at the first point-of-sale terminal which is located at a retail store and where the apparatus is at a location that is remote from the retail store;
   in response to receiving the unique account identifier, to determine whether at least one valid coupon is associated with the unique account identifier in a database of accounts;
   in response to determining that at least one valid coupon is associated with the unique account identifier in the database of accounts, to transmit an indication of the at least one valid coupon to the first point of sale terminal via the network, wherein the indication includes the at least one valid coupon;
   in response to receiving, from the first point of sale terminal, an indication of at least one redeemed coupon, to update the database of accounts and to transmit, to a manufacturer associated with the at least one redeemed coupon, an indication that the at least one redeemed coupon was redeemed against a purchased transaction,
   where the at least one redeemed coupon is at least one of the at least one valid coupon.

18. The apparatus of claim 17, where a valid coupon comprises a first coupon code portion and a second coupon code portion.

19. The apparatus of claim 18, where the indication of the at least one valid coupon comprises the first coupon code portion but not the second coupon code portion and
   the indication that the at least one redeemed coupon was redeemed comprises the second coupon code portion.

20. The apparatus of claim 17, where the indication of at least one redeemed coupon further comprises purchase transaction information, where the purchase transaction information comprises at least one of an identification of a product purchased, a time of the purchase transaction and a location of the purchase transaction.

21. The apparatus of claim 20, where the indication that the at least one redeemed coupon was redeemed further comprises the purchase transaction information.

22. The apparatus of claim 17, where the operations further comprise to monitor at least volume and traffic of redeemed coupons to identify abnormalities and to prevent coupon counterfeiting.

23. The apparatus of claim 17, where, when determining whether at least one valid coupon is associated with the unique account identifier in the database of accounts, the operations further comprise:
   to determine whether at least one associated coupon is associated with the unique account identifier in the database of accounts, and
   for each associated coupon of the at least one associated coupon, to determine whether the associated coupon has been previously redeemed and to determine whether the associated coupon has expired,
   where the associated coupon is determined to be a valid coupon in response to both
   determining that the associated coupon has not been previously redeemed and determining that the associated coupon has not expired.

24. The apparatus of claim 17, where, when updating database of accounts, the operations further comprise to deactivate the at least one redeemed coupon.

25. An apparatus, comprising a processor and a memory storing software, the processor is configured to, when executing the software, cause the apparatus to perform operations, the operations comprising:

to scan a unique account identifier;

during a purchase transaction, to transmit the unique account identifier to a coupon processing server via a network, where the coupon processing server is configured to communicate with a plurality of point of sale terminals, where the apparatus is located at a retail store and where the coupon processing server is at a location that is remote from the retail store;

in response to transmitting the unique account identifier, to receive an indication of whether at least one valid coupon is associated with the unique account identifier from the coupon processing server via the network, where a valid coupon is a coupon that has been validated by the coupon processing server and the indication includes the at least one valid coupon;

in response to receiving at least one valid coupon at the point of sale terminal as an indication that at least one valid coupon is associated with the unique account identifier from the coupon processing server via the network, to complete the purchase transaction using the at least one valid coupon against the purchase transaction; and in response to the purchase transaction comprising a redemption of at least one of the at least one valid coupon, to transmit, to the coupon processing server, an indication of the at least one redeemed coupon.

26. The apparatus of claim 25, where a valid coupon comprises a first coupon code portion and a second coupon code portion.

27. The apparatus of claim 26, where an indication of the at least one valid coupon comprises the first coupon code portion but not the second coupon code portion.

28. The apparatus of claim 25, where, when at least one valid coupon is associated with the unique account identifier, the indication of whether at least one valid coupon is associated with the unique account identifier comprises an indication of the at least one valid coupon.

29. The apparatus of claim 25, where the indication of at least one redeemed coupon further comprises purchase transaction information, where the purchase transaction information comprises at least one of: an identification of a product purchased, a time of the purchase transaction and a location of the purchase transaction.

30. An apparatus, comprising:

an input interface configured for receiving a unique account identifier from a first point of sale terminal via a network, where the apparatus is configured to communicate with a plurality of point of sale terminals, where the unique account identifier was scanned at the first point-of-sale terminal which is located at a retail store and where the apparatus is at a location that is remote from the retail store;

a processor configured for determining whether at least one valid coupon is associated with the unique account identifier in a database of accounts in response to receiving the unique account identifier;

an output interface configured for transmitting an indication of the at least one valid coupon to the first point of sale terminal via the network in response to determining that at least one valid coupon is associated with the unique account identifier in the database of accounts, wherein the indication includes the at least one valid coupon;

a server configured for updating the database of accounts and an internet connection for transmitting, to a manufacturer associated with the at least one redeemed coupon, an indication that the at least one redeemed coupon was redeemed, in response to receiving, from the first point of sale terminal, an indication of at least one redeemed coupon against a purchased transaction, where the at least one redeemed coupon is at least one of the at least one valid coupon.

31. The apparatus of claim 30, where a valid coupon comprises a first coupon code portion and a second coupon code portion.

32. The apparatus of claim 31, where the indication of the at least one valid coupon comprises the first coupon code portion but not the second coupon code portion and the indication that the at least one redeemed coupon was redeemed comprises the second coupon code portion.

33. An apparatus, comprising:

a first input interface configured for scanning a unique account identifier;

an output interface configured for transmitting, during a purchase transaction, the unique account identifier to a coupon processing server via a network, where the coupon processing server is configured to communicate with a plurality of point of sale terminals, where the apparatus is located at a retail store and where the coupon processing server is at a location that is remote from the retail store;

a point of sale terminal configured for receiving an indication of whether at least one valid coupon is associated with the unique account identifier from the coupon processing server via the network in response to transmitting the unique account identifier, where a valid coupon is a coupon that has been validated by the coupon processing server and the indication includes the at least one valid coupon;

the point of sale terminal configured for completing the purchase transaction using the at least one valid coupon against the purchase transaction in response to receiving the indication that at least one valid coupon is associated with the unique account identifier from the coupon processing server via the network; and the output interface configured for transmitting, to the coupon processing server, an indication of the at least one redeemed coupon in response to the purchase transaction comprising a redemption of at least one of the at least one valid coupon.

34. The apparatus of claim 33, where a valid coupon comprises a first coupon code portion and a second coupon code portion.

35. The apparatus of claim 34, where an indication of the at least one valid coupon comprises the first coupon code portion but not the second coupon code portion.

* * * * *